US009925850B2

(12) United States Patent
Yoshida et al.

(10) Patent No.: US 9,925,850 B2
(45) Date of Patent: Mar. 27, 2018

(54) WINDOW PANEL SUPPORT STRUCTURE

(71) Applicant: TOYOTA JIDOSHA KABUSHIKI KAISHA, Toyota-shi, Aichi-ken (JP)

(72) Inventors: Minoru Yoshida, Toyota (JP); Masaru Toyota, Toyota (JP); Takayuki Okubo, Toyota (JP); Yoshiharu Yamanaka, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/893,718

(22) PCT Filed: May 27, 2014

(86) PCT No.: PCT/IB2014/000872
§ 371 (c)(1),
(2) Date: Nov. 24, 2015

(87) PCT Pub. No.: WO2014/191812
PCT Pub. Date: Dec. 4, 2014

(65) Prior Publication Data
US 2016/0121701 A1 May 5, 2016

(30) Foreign Application Priority Data
May 31, 2013 (JP) ................................. 2013-115795

(51) Int. Cl.
*B60J 5/04* (2006.01)
*B60J 1/00* (2006.01)
(Continued)

(52) U.S. Cl.
CPC ............. *B60J 5/0402* (2013.01); *B60J 1/004* (2013.01); *B60J 1/006* (2013.01); *B60J 1/007* (2013.01);
(Continued)

(58) Field of Classification Search
CPC ............................... B60J 5/0402; B60J 10/79
See application file for complete search history.

(56) References Cited

U.S. PATENT DOCUMENTS 4,240,227 A * 12/1980 Hasler ...................... B60J 10/79
49/348
4,418,498 A * 12/1983 Wanlass ................. E05F 11/382
49/348

(Continued)

FOREIGN PATENT DOCUMENTS

EP       0295660 A2    12/1988
JP       2005-255113 A   9/2005

(Continued)

*Primary Examiner* — Katherine W Mitchell
*Assistant Examiner* — Catherine A Kelly
(74) *Attorney, Agent, or Firm* — Andrews Kurth Kenyon LLP

(57) ABSTRACT

A window panel support structure includes a fixed panel, and a movable panel. The movable panel opens and closes a window by moving up and down. A front-side guide member is provided on an interior-side face of a rear edge part of the fixed panel which is adjacent to the movable panel. The front-side guide member includes a front-side guide groove provided along the rear edge part. The front-side guide groove is opened toward a front edge part. A front-side slide member is provided on an interior-side face of a front edge part of the movable panel which is adjacent to the fixed panel. The front-side slide member includes a front slider provided along the front edge part and is bent toward a rear edge part. The front slider is fitted to the front-side guide groove.

14 Claims, 16 Drawing Sheets

(51) Int. Cl.
  *B60J 1/17* (2006.01)
  *B60J 10/79* (2016.01)
  *B60J 1/10* (2006.01)

(52) U.S. Cl.
  CPC . *B60J 1/10* (2013.01); *B60J 1/17* (2013.01); *B60J 10/79* (2016.02)

(56) References Cited

U.S. PATENT DOCUMENTS

| | | | | |
|---|---|---|---|---|
| 4,483,100 A * | 11/1984 | Blankenburg | ........ | E05F 11/426 49/352 |
| 4,490,942 A * | 1/1985 | Arnheim | ................. | B60J 10/24 49/374 |
| 4,567,691 A * | 2/1986 | Warner | ................... | B60J 10/79 49/374 |
| 4,581,851 A * | 4/1986 | Warner | ................. | B60J 10/248 428/122 |
| 4,591,204 A * | 5/1986 | Gallitzendoerfer | ..... | B60R 13/04 296/146.3 |
| 4,608,779 A * | 9/1986 | Maeda | ................... | B60J 10/248 428/122 |
| 4,611,435 A * | 9/1986 | Warner | ................... | B60J 10/79 49/374 |
| 4,653,802 A * | 3/1987 | Watanabe | .............. | B62D 25/06 296/146.2 |
| 4,874,201 A * | 10/1989 | Scaglietti | ................ | B60J 10/24 296/146.9 |
| 4,932,712 A * | 6/1990 | Tomforde | ............... | B60R 13/00 296/146.3 |
| 4,944,984 A * | 7/1990 | Kunert | ...................... | B60J 1/17 24/564 |
| 4,984,389 A * | 1/1991 | Benoit | .................. | B60J 5/0404 296/146.3 |
| 5,048,232 A * | 9/1991 | Miyagawa | .......... | E05D 15/0647 49/374 |
| 5,086,589 A * | 2/1992 | dibenedetto | ........... | B60J 5/0402 296/146.3 |
| 5,159,781 A * | 11/1992 | Glossop, Jr. | ................ | B60J 1/17 49/375 |
| 5,613,325 A * | 3/1997 | Mariel | .............. | B32B 17/10036 49/374 |
| 5,732,509 A * | 3/1998 | Buehler | ................... | B60J 10/79 49/440 |
| 5,832,667 A * | 11/1998 | Buening | ............... | E05F 11/486 49/212 |
| 6,141,910 A * | 11/2000 | Kobrehel | .................. | B60J 5/0402 49/348 |
| 6,572,176 B2 * | 6/2003 | Davis | ....................... | B60J 10/76 296/146.16 |
| 2005/0229496 A1 | 10/2005 | Tashima et al. | | |

FOREIGN PATENT DOCUMENTS

| | | |
|---|---|---|
| JP | 2005-297602 A | 10/2005 |
| JP | 4139345 B2 | 8/2008 |
| JP | 2010-106548 A | 5/2010 |
| WO | 2011/014684 A1 | 2/2011 |

* cited by examiner

WINDOW PANEL SUPPORT STRUCTURE

CROSS-REFERENCE TO RELATED APPLICATIONS

This is a national phase application based on the PCT International Patent Application No. PCT/IB2014/000872 filed May 27, 2014, claiming priority to Japanese Patent Application No. 2013-115795 filed May 31, 2013, the entire contents of both of which are incorporated herein by reference.

BACKGROUND OF THE INVENTION

1. Field of the Invention

The present invention relates to a window panel support structure.

2. Description of Related Art

Conventionally, as a window panel provided in a vehicle door of an automobile or the like, there is such a window panel in which two panels are placed adjacent to each other in a vehicle-body front-rear direction in a window frame provided in a single door. At this time, one of the two panels is provided as a fixed panel, and the other one of the two panels is provided as a movable panel to open and close the window frame.

In a case where the fixed panel and the movable panel are provided adjacent to each other in one window frame as such, a guide member for guiding one end side of the movable panel to move up and down is required between the panels. Further, if the fixed panel and the movable panel are placed in a single plane or a single curved surface on an outside surface of a vehicle-body without any steps, it is difficult to directly fit the movable panel into the guide member.

In view of this, there has been provided such a technique that: a slide member is attached to an interior-side face of a movable panel; and the slide member is fitted into a guide member so that the movable panel is guided to move up and down, thereby preventing occurrence of a step between the fixed panel and the movable panel (see, for example, Japanese Patent Application Publication No. 2005-297602 (JP 2005-297602 A), Japanese Patent No. 4139345).

However, in either of the above window panel support structures of the related art, the guide member is opened toward the movable panel. Furthermore, the slide member has a plate-like shape in which the slide member just projects toward the guide member from the interior-side face of the movable panel.

Accordingly, in a case where the fixed panel is set in the window frame after the movable panel is set in the window frame first and held by a regulator, a fitting direction in which the fixed panel is fitted to the window frame becomes reverse to a fitting direction in which the guide member is fitted to the slide member, thereby making it difficult to set the fixed panel.

Further, the guide member is provided between the fixed panel and the movable panel so as to serve as a sash exposed outside. Thus, the fixed panel is clearly separated from the movable panel, thereby making it difficult to secure an appearance like a single panel.

SUMMARY OF THE INVENTION

The present invention provides a window panel support structure which allows a fixed panel to be easily set and which improves an appearance of a window panel.

A window panel support structure according to an aspect of the invention includes a window frame, a fixed panel, a movable panel, a guide member and a slide member. The fixed panel is fixed to the window frame. The movable panel is placed in the window frame so as to be planarly adjacent to the fixed panel, and is configured to move up and down along a sliding direction in the window frame. The guide member is provided on an interior-side face of a first edge part of the fixed panel and includes a guide groove provided along the first edge part of the fixed panel. The first edge part of the fixed panel is adjacent to the movable panel. The guide groove is opened toward a second edge part of the fixed panel. The slide member is provided on an interior-side face of first edge part of the movable panel and includes a fitting part provided along the first edge part of the movable panel. The first edge part of the movable panel is adjacent to the fixed panel. The fitting part is bent toward a second edge part of the movable panel and fitted to the guide groove. The fitting part is fitted to the guide groove so that the movable panel is supported by the guide member so as to be movable up and down. The second edge part of the fixed panel is opposite the first edge part of the fixed panel. The second edge part of the movable panel is opposite the first edge part of the movable panel.

According to this configuration, the fixed panel and the movable panel are placed in a single window frame. Further, the guide member is provided on the interior-side face of the first edge part of the fixed panel, and the guide member is provided with the guide groove provided along the first edge part of the fixed panel. The first edge part of the fixed panel is adjacent to the movable panel, and the guide groove is opened toward the second edge part of the fixed panel. Further, the slide member is provided on the interior-side face of the first edge part of the movable panel, and the fitting part is provided along the first edge part of the movable panel. The first edge part of the movable panel is adjacent to the fixed panel, and the fitting part is bent toward the second edge part of the movable panel and fitted to the guide groove. Hereby, the fitting part is fitted to the guide groove, so that the movable panel is supported by the guide member so as to be movable up and down.

In the window panel support structure according to the aspect of the present invention, the movable panel is set in the window frame first, and the fixed panel is set in the window frame later, for example. At this time, a setting direction of the fixed panel toward an outside from an inside of the window frame can be arranged to be the same as an insertion direction of the slide member with respect to the guide groove. Accordingly, it is possible to easily set the fixed panel in the window frame. Further, it is possible to cover the slide member with the guide member, so that only the guide member is observable on the appearance, thereby making it possible to improve the appearance.

In the window panel support structure according to the aspect of the invention, the guide member may include a cover part that projects so as to overlap with the interior-side face of the movable panel in a space portion. Furthermore, the slide member may be bent so as to be placed over the space portion and the guide groove. When the window is closed by the movable panel, an end face of the fixed panel and an end face of the movable panel may face each other. The space portion is a space formed between the guide member and the interior-side face of the movable panel.

According to this configuration, it is possible to set the slide member in the space portion, and it is possible to place surfaces of these panels so as to be adjacent to each other in a flush manner on a plane or curved surface without any steps, thereby making it possible to improve the appearance.

In the window panel support structure according to the aspect of the invention, the guide member may include a notch on a side close to the second edge part of the fixed panel. The notch extends along the first edge part of the fixed panel.

According to this configuration, it is possible to more easily perform fitting of the slide member with respect to the guide groove.

In the window panel support structure according to the aspect of the invention, the fitting part may include a spring portion configured to exert force on an inner wall surface of the guide groove.

According to this configuration, it is possible to absorb that backlash between the slide member and the guide groove which occurs when the movable panel moves up and down, and to restrain occurrence of noise.

The window panel support structure according to the aspect of the invention may further include a second slide member and a second guide member. The second slide member is provided on the interior-side face of the second edge part of the movable panel, along the second edge part of the movable panel. The second guide member is provided in the window frame and fitted to the second slide member. The second slide member is fitted to the second guide member so that the movable panel is supported by the second guide member so as to be movable up and down. The second slide member includes a second fitting part. The second fitting part projects from the second edge part of the movable panel and faces the window frame. The second guide member includes a second guide groove that is opened toward the second edge part of the movable panel. The second fitting part is fitted to the second guide groove. An opening part of the second guide groove is provided with an engaging part configured to engage with the second fitting part.

According to this configuration, it is possible to support the movable panel so as to be movable up and down, even at the edge part of the movable panel which is opposite to the fixed panel. Further, even if the movable panel is displaced along a plane direction due to vibration or the like, the second fitting part is engaged with the engaging part, thereby making it possible to restrain the second fitting part from falling off the second guide groove.

In the window panel support structure according to the aspect of the invention, the second fitting part may integrally include a second spring portion and a third spring portion. The second spring portion is configured to exert force on an inner wall surface of the second guide groove. The third spring portion is configured to exert force on the engaging part.

According to this configuration, it is possible to absorb, by the second spring portion, that backlash between the second fitting part and the second guide groove which occurs when the movable panel moves up and down, and to restrain occurrence of noise. Further, even if the movable panel is displaced along a plane direction due to vibration or the like, it is possible to restrain the second fitting part from falling off the second guide groove, and at the same time, it is possible to restrain occurrence of noise by absorbing, by the third spring portion, backlash between the second fitting part and the second guide groove.

In the window panel support structure according to the aspect of the invention, a recessed part extending along the sliding direction of the movable panel may be formed on an inner wall surface of the second guide groove.

According to this configuration, even if the fitting part tightly makes contact with the second guide groove, it is possible to easily remove dust and dirt that penetrate the second guide groove, from the recessed part.

In the window panel support structure according to the aspect of the invention, the movable panel may be a sheet of reinforced glass. Furthermore, a lower edge part of the sheet of the reinforced glass may be held by a bracket with a bolt.

The window panel support structure according to the aspect of the invention may further include a regulator configured to move the movable panel up and down. The bracket is connected to the regulator.

According to this configuration, it is possible to configure the movable panel so as not to easily fall off the bracket.

In the window panel support structure according the aspect of the invention, the movable panel may be a sheet of laminated glass including an interlayer. A lower edge part of the sheet of the laminated glass may be held by a bracket with an adhesive. An insertion pin may be provided in the bracket. A locking hole may be formed in the lower edge part of the movable panel. The insertion pin is inserted into the bracket without contacting the bracket.

The window panel support structure according to the aspect of the invention may further includes a regulator configured to move the movable panel up and down. The bracket is connected to the regulator.

According to this configuration, in a case where the movable panel and the regulator cannot be fastened with a bolt directly because the sheet of the laminated glass is used as the movable panel, even if an adhesive on the lower edge part of the movable panel is peeled off from the bracket, the movable panel does not easily fall off the bracket because the insertion pin is inserted into the locking hole.

According to the aspect of the present invention, it is possible to provide a window panel support structure which allows a fixed panel to be easily set and which improves an appearance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A is a side view of the fixed panel, FIG. 2B is an expanded sectional view taken along a line IIB-IIB in FIG. 2A, and FIG. 2C is an expanded sectional view taken along a line IIC-IIC in FIG. 2A;

FIG. 3A is a side view of the movable panel, and FIG. 3B is a view in which an expanded sectional view taken along a line IIIB-IIIB in FIG. 3A is partially omitted;

FIG. 5A is a perspective view of a base, and FIG. 5B is a perspective view of the front-side slide member;

FIG. 12A is an expanded sectional view taken along a line XIIA-XIIA in FIG. 1, and FIG. 12B is an expanded sectional view taken along a line XIIB-XIIB in FIG. 1;

FIG. 13A is an expanded sectional view taken along a line XIIIA-XIIIA in FIG. 1, and FIG. 13B is an expanded sectional view of an essential part;

FIG. 15A is an explanatory view before the slide member is fitted into a guide member, and FIG. 15B is an expanded sectional view of a position corresponding to a line XVB-XVB in FIG. 15A.

DETAILED DESCRIPTION OF EMBODIMENTS

The following describes an embodiment in which a window panel support structure according to the present invention is applied to a vehicle door for a front seat of an automobile or the like, with reference to the drawings.

Figure 1:
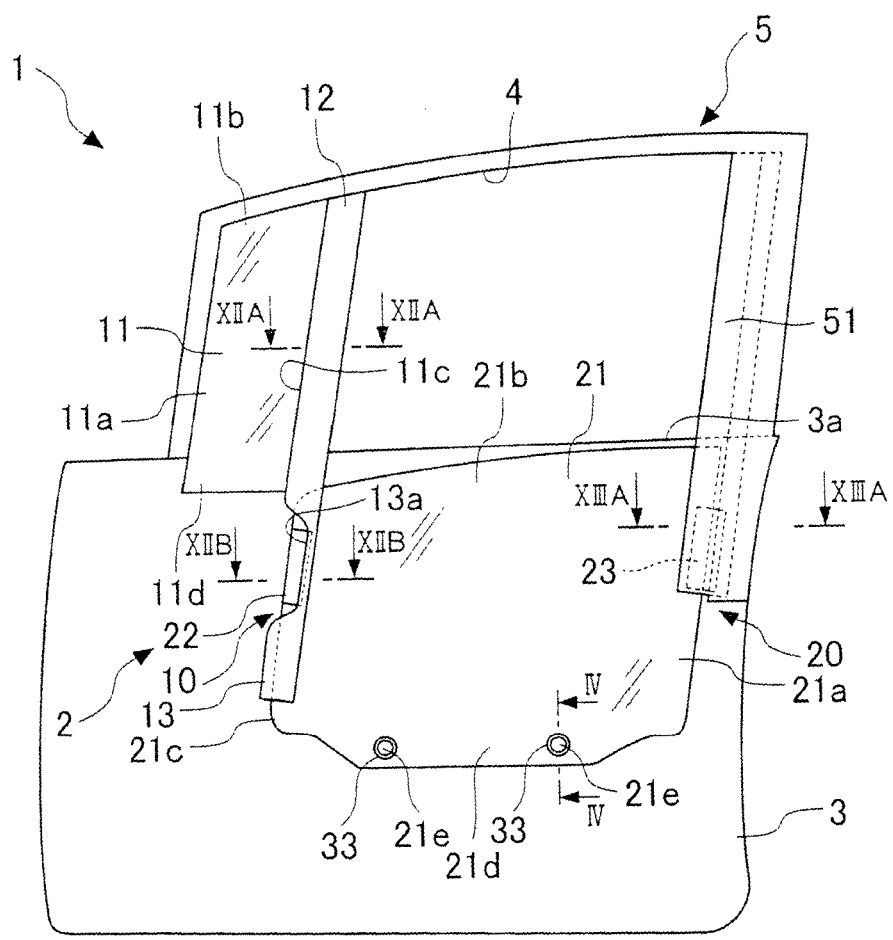
FIG. 1 is an explanatory view of a vehicle door to which a window panel support structure according to a first embodiment of the present invention is applied.

Initially, the following describes a structure of the present embodiment. As illustrated in FIG. 1, a vehicle door 1 of the present embodiment includes a door main body 3, a sash 5, a front-side fixed panel 11, and a rear-side movable panel 21. The sash 5 is placed on a upper side of the door main body 3, and serves as a window frame, which forms a window opening 4, together with an upper edge part 3a of the door main body 3. The front-side fixed panel 11 and the rear-side movable panel 21 constitute a window panel 2 to be provided in the window opening 4. Accordingly, in the present embodiment, the window panel 2 is constituted by the fixed panel 11 provided on a front side and the movable panel 21 provided on a rear side. Further, in the window panel 2, in a state where the movable panel 21 is moved up so as to close the window opening 4, the fixed panel 11 and the movable panel 21 are adjacent to each other in a vehicle-body front-rear direction.

Further, the vehicle door 1 includes a front-side slide member 22, a front-side guide member 12, a rear-side slide member 23, and a rear-side guide member 51. The front-side slide member 22, the front-side guide member 12, the rear-side slide member 23, and the rear-side guide member 51 serve as a moving guide that guides the movable panel 21 in an up-and-down direction. The front-side guide member 12 engages with the front-side slide member 22 so as to guide the front-side slide member 22. The rear-side guide member 51 engages with the rear-side slide member 23 so as to guide the rear-side slide member 23. The front-side guide member 12 and the rear-side guide member 51 extend inside the door main body 3 so as to be fixed thereto, and are configured to support, via the front-side slide member 22 and the rear-side slide member 23, the movable panel 21 that moves down inside the door main body 3 when the window opening 4 is opened. The moving guide that guides the movable panel 21 in the up-and-down direction may be considered to constitute the window panel support structure according to the present invention.

As for the door main body 3, FIG. 1 illustrates only an outer shape of a door outer panel, for the convenience of the description. Further, FIG. 1 illustrates a front door on a vehicle-body right side when the front door is viewed from an interior side, and a well-known door inner panel, door trim, and the like are not illustrated herein. Further, a well-known technique is used for the sash 5, so that an attachment structure thereof to the door main body 3 is not illustrated, and only an outer shape thereof is illustrated. A lower edge part of the movable panel 21 is connected to a regulator (not shown) included in the door main body 3. The movable panel 21 is configured to move up and down by driving of the regulator.

The sash 5 forms one window opening 4 together with the upper edge part 3a of the door main body 3 in the window frame. The sash 5 encloses a part of the window opening 4 in the window panel 2, e.g., an upper edge part of the fixed panel 11. The fixed panel 11 is fixed to the window frame, and is configured to usually close a front side, which is a left side in FIG. 1. The sash 5 also encloses the other part of the window opening 4 in the window panel 2, e.g., an upper edge part of the movable panel 21 when the window opening 4 is closed. Note that movable panel 21 is provided on a rear side, which is a right side in FIG. 1, and configured to close the window opening 4 by moving up.

As the fixed panel 11 and the movable panel 21, a sheet of reinforced glass may be used, for example. In the meantime, a sheet of laminated glass including an interlayer 21g having an excellent sound-insulating performance may be used so that they have sound-insulating properties. At this time, the sound-insulating properties of the fixed panel 11 and the movable panel 21 may be different from each other.

In the present embodiment, a front side of the sash 5 and a part of an upper side of the sash 5 respectively support a front edge part 11a of the fixed panel 11 and an upper edge part 11b of the fixed panel 11. The front edge part 11a is placed on the front side and the upper edge part 11b is placed on a vehicle-body upper side. Further, in a state where the window opening 4 is closed, a rear side of the sash 5 and the other part of the sash 5 respectively support a rear edge part 21a of the movable panel 21 and an upper edge part 21b of the movable panel 21 on the vehicle-body upper side. Note that the front edge part 11a of the fixed panel 11 which is placed on the front side may be considered as the second edge part of the fixed panel according to the present invention. Further, the rear edge part 21a of the movable panel 21 on the rear side may be considered as a second edge part of the movable panel according to the present invention.

Figure 2A:
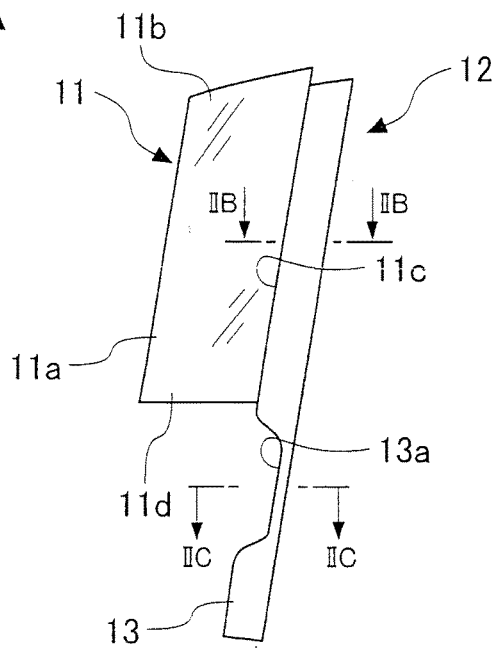
FIG. 2A, FIG. 2B and FIG. 2C illustrate a relationship with a fixed panel in the window panel support structure according to the first embodiment of the present invention.
Figure 2B:
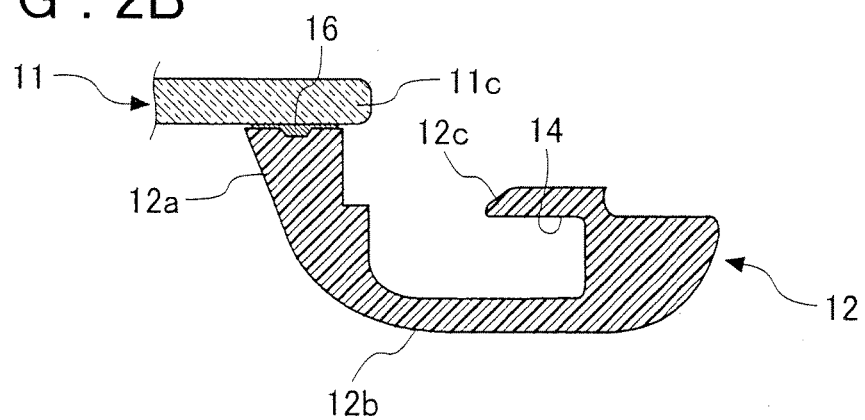
Figure 2C:
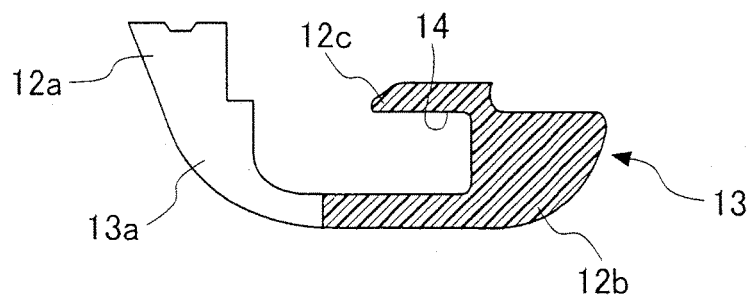
Figure 3A:
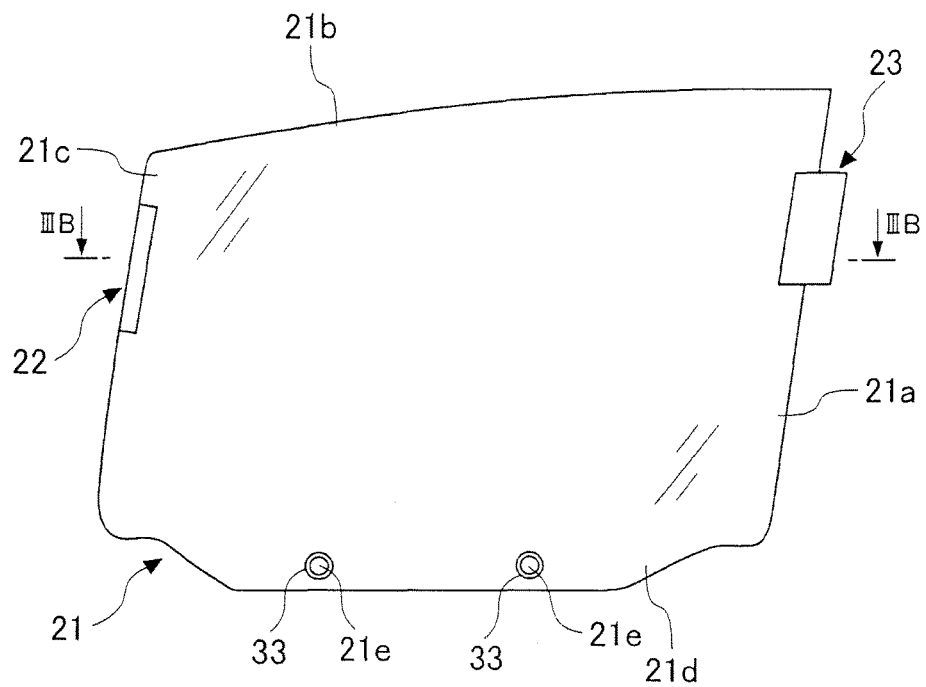
FIG. 3A and FIG. 3B illustrate a relationship with a movable panel in the window panel support structure according to the first embodiment of the present invention.
Figure 3B:
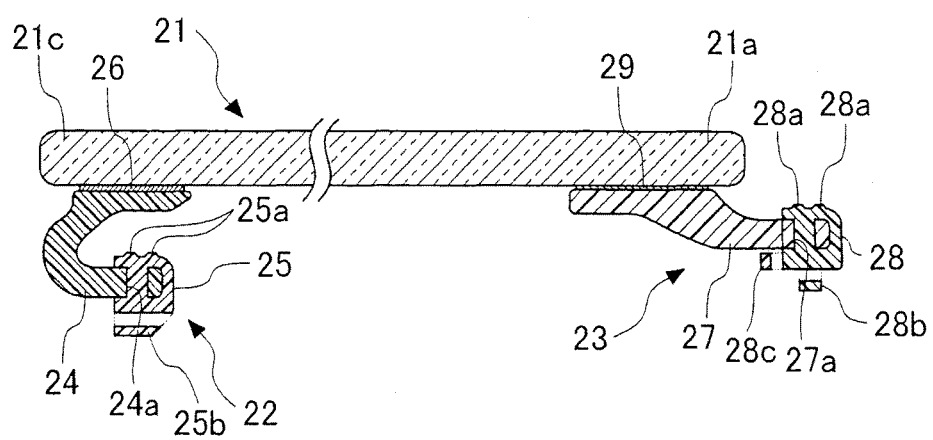

As illustrated in FIGS. 1, 2, and 3, a window panel front-side support structure 10 includes the front-side slide member 22 and the front-side guide member 12. The front-side slide member 22 is provided on a front edge part of a vehicle inside face of the movable panel 21. The front-side guide member 12 is attached to the rear edge part 11c of an interior-side face of the fixed panel 11 and engages with the front-side slide member 22 so as to guide the front-side slide member 22. The rear edge part 11c of the fixed panel 11 is adjacent to the movable panel 21. Note that the front-side guide member 12 may be considered as a guide member according to the present invention. The front-side slide member 22 may be considered as a slide member according to the present invention. The rear edge part 11c of the fixed panel 11 may be considered as a first edge part of the fixed panel according to the present invention.

The front-side guide member 12 has a sectional shape as illustrated in FIG. 2B and FIG. 2C and includes a base part 12a, a cover part 12b, and a folded-back rib 12c. The base part 12a, the cover part 12b, and the folded-back rib 12c are integrally formed. A generally upper-half part of the front-side guide member 12 is bonded to the rear edge part 11c of the fixed panel 11 on a movable-panel-21 side. A generally lower-half part of the front-side guide member 12 is an extending part 13 that projects downward from a lower edge part 11d of the fixed panel 11 and extends inside the door main body 3. Further, an upper edge part of the front-side guide member 12 is placed at a position lower than the upper edge part 11b of the fixed panel 11 and directly contacts with the sash 5.

The base part 12a projects in a direction away from the interior-side face of the fixed panel 11, that is, toward a vehicle-body inner side in a vehicle-width direction. The cover part 12b projects from the base part 12a toward the movable panel 21. The cover part 12b projects from the base part 12a toward the movable panel 21 so as to form a space portion 15 (see FIG. 12) between the cover part 12b and an interior-side face of the movable panel 21. The folded-back rib 12c projects inwardly from a projecting end of the cover part 12b, that is, projects toward the fixed panel 11 outside the vehicle body.

Hereby, the cover part 12b and the folded-back rib 12c form a front-side guide groove 14 opened toward the front edge part 11a from the rear edge part 11c of the fixed panel 11.

Further, the base part 12a is fixed to the interior-side face of the fixed panel 11 with an adhesive 16. Note that the front-side guide groove 14 may be considered as a guide groove according to the present invention. Further, the base part 12a may be fixed to the interior-side face of the fixed panel 11 with a double-stick tape instead of the adhesive 16.

The extending part 13 of the front-side guide member 12 includes a notch 13a formed by cutting a middle part of the extending part 13 in a range from the base part 12a to part of cover part 12b. The middle part of the extending part 13 has a sectional shape illustrated in FIG. 2C.

Figure 13A:
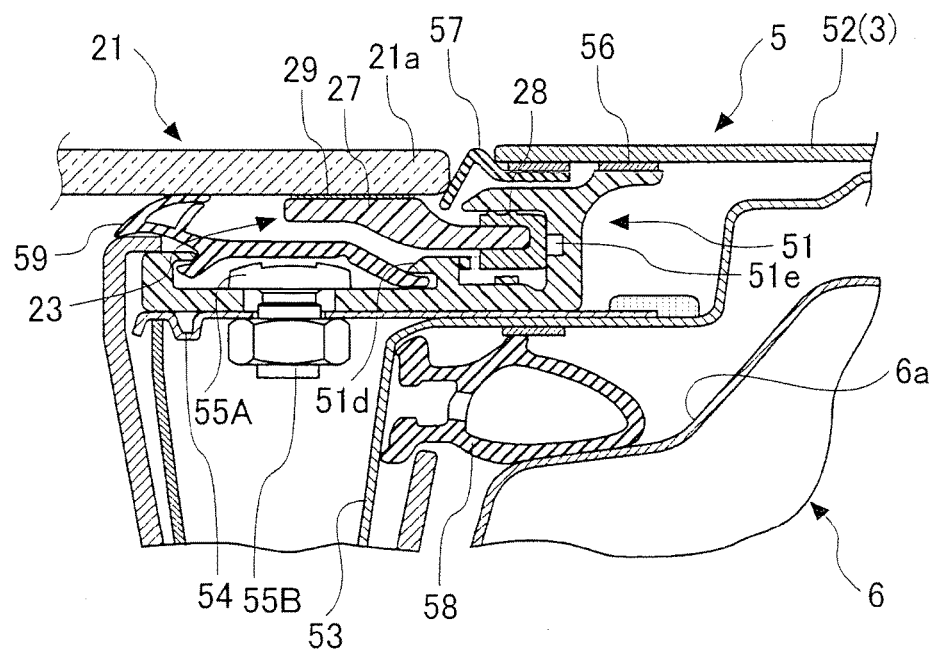
FIG. 13A and FIG. 13B illustrate a window panel rear-side support structure according to the first embodiment of the present invention.
Figure 13B:
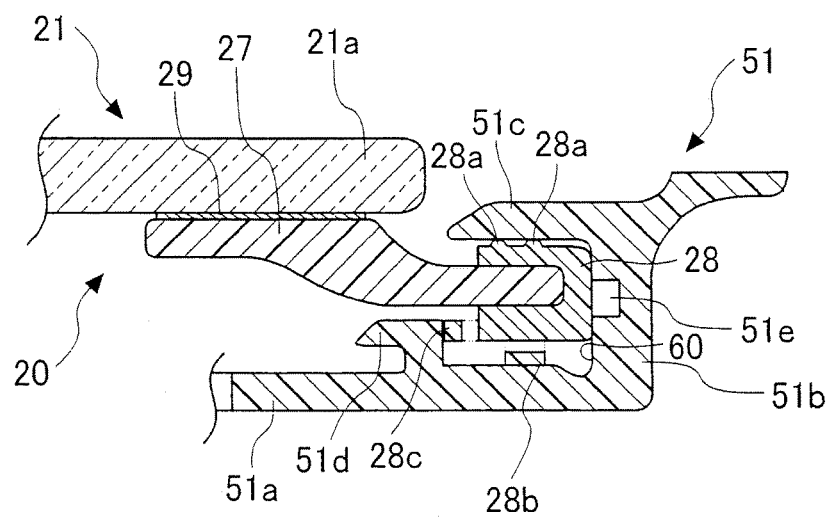

As illustrated in FIGS. 1, 3, 13, a window panel rear-side support structure 20 includes the rear-side slide member 23 provided on a rear end part of the vehicle inside face of the movable panel 21, and the rear-side guide member 51 that engages with the rear-side slide member 23 so as to guide the rear-side slide member 23. The rear-side slide member 23 may be considered as a second slide member according to the present invention.

Figure 4:
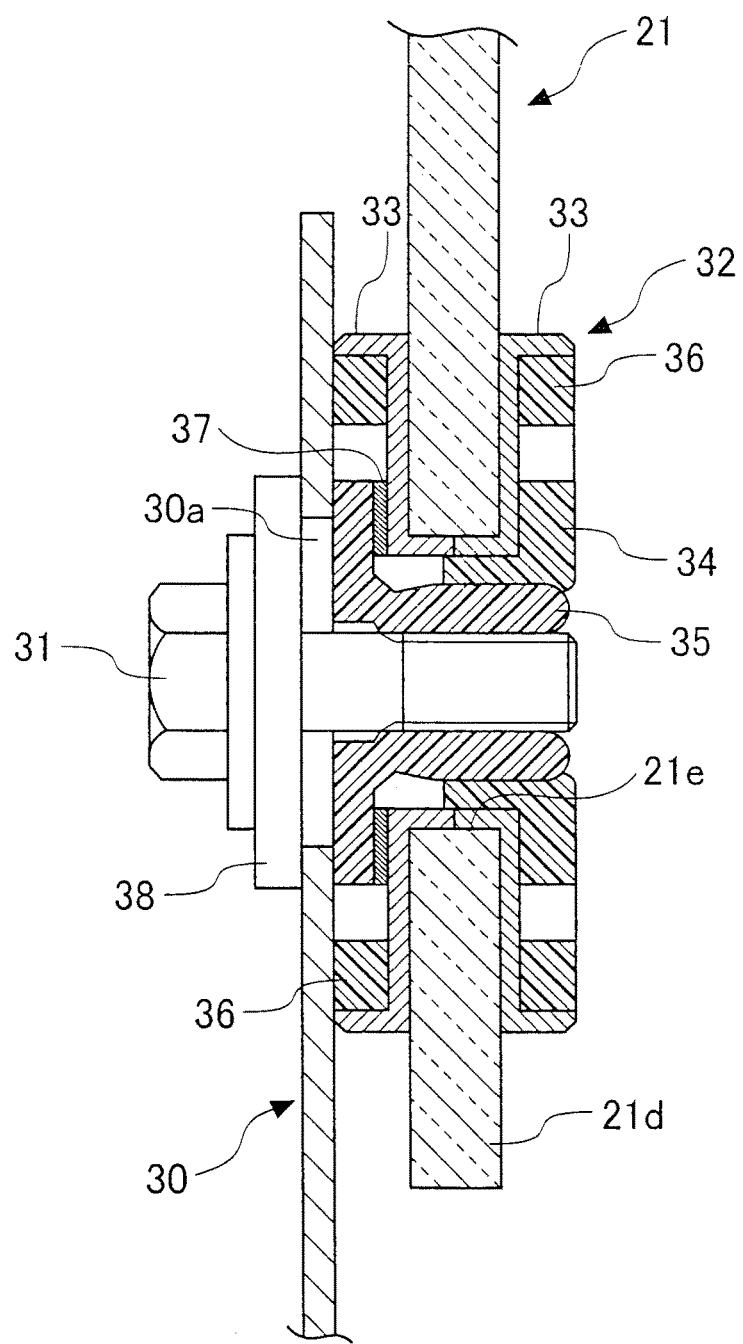
FIG. 4 illustrates a connection structure between a sheet of reinforced glass as the movable panel and a bracket in the window panel support structure according to the first embodiment of the present invention, and is an expanded sectional view of a position corresponding to a line IV-IV in FIG. 1.

As illustrated in FIG. 4, a lower edge part 21d of the movable panel 21 on a vehicle-body lower side is fixed to a panel hold bracket 30 with bolts 31 as illustrated in FIG. 4. The panel hold bracket 30 is a connection member that connect the regulator (not shown) to the movable panel 21. The regulator is configured to move the movable panel 21 up and down together with the front-side slide member 22 and the rear-side slide member 23.

Note that a front edge part 21c of the movable panel 21 on the front side may be considered as a first edge part of the movable panel according to the present invention. Further, the front-side slide member 22 may be considered as the slide member according to the present invention. The rear-side slide member 23 may be considered as the second slide member according to the present invention.

The front-side slide member 22 is placed in the front edge part 21c of the movable panel 21 along part of the front edge part 21c. The front-side slide member 22 includes a base 24 having a generally U-shaped section that is opened toward the rear edge part 21a, and a front slider 25 provided in a tip of the base 24. The base 24 is fixed to the interior-side face of the movable panel 21 with an adhesive 26.

The front-side slide member 22 is placed at an appropriate position in the front edge part 21c, with an appropriate length according to a size and a shape of the movable panel 21 or an inclination angle of the front edge part 21c. Accordingly, the front-side guide member 12 including the extending part 13 has an entire length in which the front-side guide member 12 is fitted to the front-side slide member 22 throughout a moving range of the movable panel 21. Note that the base 24 may be fixed to the interior-side face of the movable panel 21 with a double-stick tape instead of the adhesive 26.

Figure 5A:
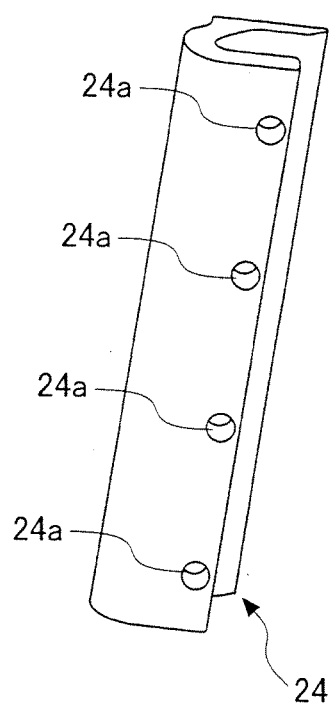
FIG. 5A and FIG. 5B illustrate a front-side slide member in the window panel support structure according to the first embodiment of the present invention.
Figure 5B:
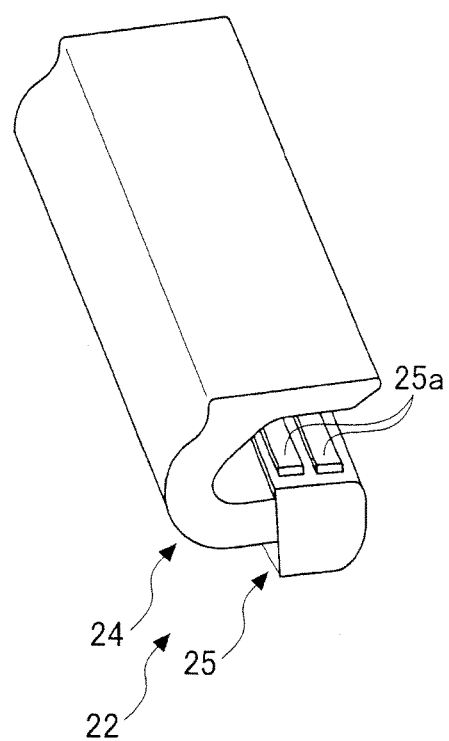

The base 24 is bent so as to be folded back at a position where the base 24 does not project from the front edge part 21c of the movable panel 21. As illustrated in FIG. 5, the base 24 has a plurality of resin flowing holes 24a formed on a projecting-end side. Hereby, at the time when a front slider 25 is formed integrally with the base 24 by injection molding, molten resin penetrate the base 24 and is hardened, so that the base 24 holds the front slider 25 to prevent front slider 25 from falling off. Note that, in the present embodiment, the base 24 is folded back, but a tip thereof may extend by bending in a crank shape toward the rear edge part 21a from the front edge part 21c of the movable panel 21. At this time, when the base 24 has a crank shape, the base 24 is elongated in a front-rear direction of the movable panel 21, so that the extending part 13 of the front-side guide member 12 also projects longer in a front-rear direction of the fixed panel 11. Accordingly, it is possible to make the base 24 shorter in the front-rear direction of the movable panel 21, than by forming the base 24 into the crank shape, by bending the base 24 so as to be folded back at the position where the base 24 does not project from the front edge part 21c of the movable panel 21. Further, the extending part 13 of the front-side guide member 12 is configured to project slightly in the front-rear direction of the fixed panel 11, which can contribute to a downsizing of each member.

The front slider 25 is fitted to the front-side guide groove 14 in its sectional thickness direction. The front slider 25 includes a rail part 25a formed along a longitudinal direction, which is an up-and-down direction, thereby reducing a frictional resistance at the time of making contact with an inner wall surface of the front-side guide groove 14 when the movable panel 21 moves up and down.

Figure 6:
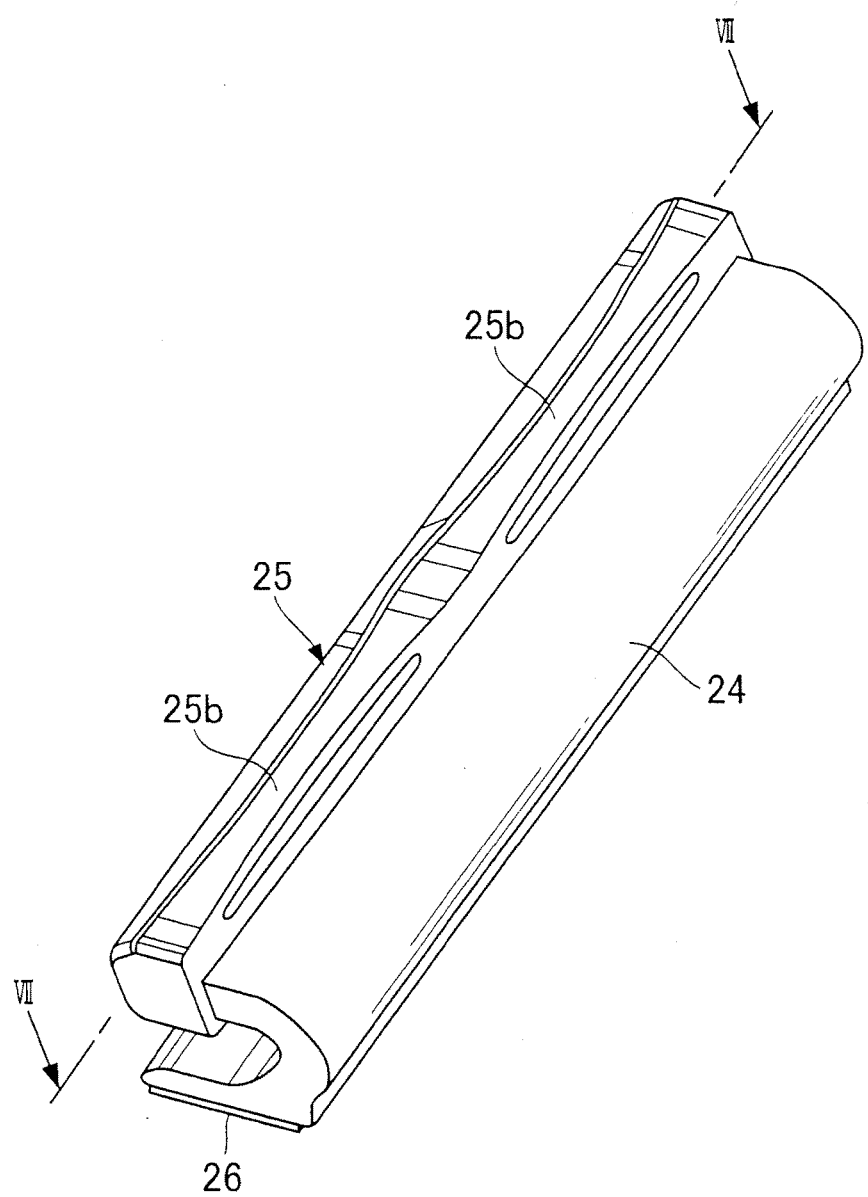
FIG. 6 is a perspective view of the front-side slide member in the window panel support structure according to the first embodiment of the present invention.
Figure 7:
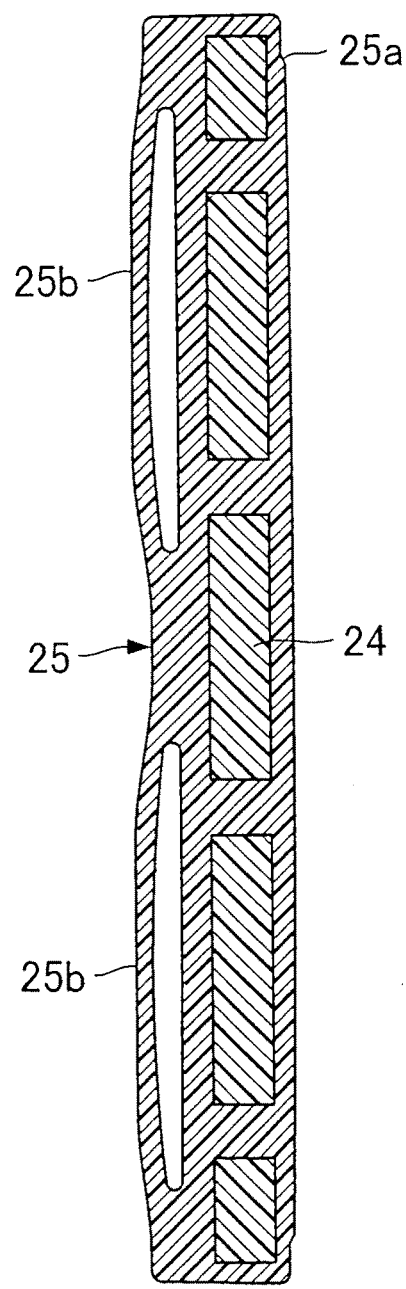
FIG. 7 illustrates the front-side slide member in the window panel support structure according to the first embodiment of the present invention, and is a sectional view of a position corresponding to a line VII-VII in FIG. 6.

As illustrated in FIGS. 6 and 7, the front slider 25 includes two spring portions 25b on an outer wall surface thereof on a side opposite to the rail part 25a. Note that the front slider 25 may be considered as a fitting part according to the present invention.

Two spring portions 25b are formed along the longitudinal direction of the front slider 25. The spring portion 25b is formed in an arch shape that is elastically deformable. The spring portion 25b elastically deforms so as to exert force on the inner wall surface of the front-side guide groove 14.

Accordingly, in the sectional thickness direction of the front slider 25, the rail part 25a and the spring portions 25b make pressure contact with the front-side guide groove 14. This absorbs that backlash between the front slider 25 and the front-side guide groove 14 which occurs when the movable panel 21 moves up and down, thereby restraining occurrence of noise.

As illustrated in FIGS. 1, 3 and 13, the rear-side slide member 23 is placed in a middle of the rear edge part 21a of the interior-side face of the movable panel 21 in the up-and-down direction. The rear-side slide member 23 includes a base 27 and a rear slider 28. A base end of the base 27 is bonded to the rear edge part 21a with an adhesive 29. The other end of the base 27 is distanced from an extension surface of the interior-side face of the movable panel 21 so as to project toward the rear side more than the movable panel 21. The rear slider 28 is provided at a tip of the base 27. Note that the base 27 may be fixed to the interior-side face of the movable panel 21 with a double-stick tape instead of the adhesive 29.

The rear-side slide member 23 is placed at an appropriate position in the rear edge part 21a, with an appropriate length according to the size and the shape of the movable panel 21 or an inclination angle of the rear edge part 21a. Accordingly, a bottom end of a rear standing part of the sash 5 is extended to a middle of the door main body 3 in the up-and-down direction so as to have a length that allows the sash 5 to be fitted to the rear-side slide member 23 throughout the moving range of the movable panel 21.

The rear-side slide member 23 is configured such that the base 27 and the rear slider 28 are formed integrally with each other by two-color molding. The rear slider 28 is molded such that molten resin is filled into a plurality of resin flowing holes 27a provided on a projecting end side of the base 27 so that the rear slider 28 is integrated with the base 27. Similarly to the front slider 25, the rear slider 28 includes a rail part 28a on a vehicle-body outer side surface along the longitudinal direction.

Figure 8:
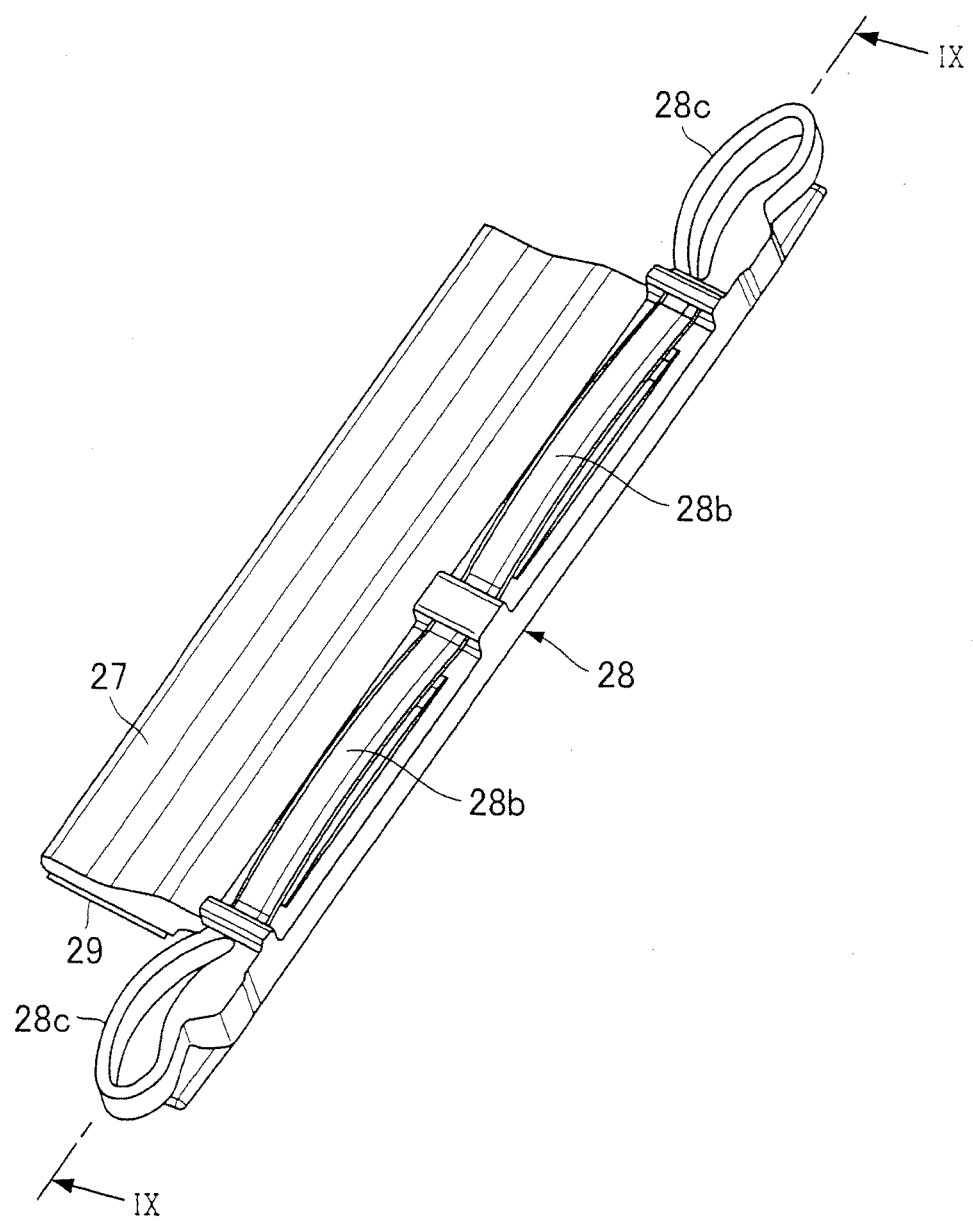
FIG. 8 is a perspective view of a rear-side slide member in the window panel support structure according to the first embodiment of the present invention.
Figure 9:
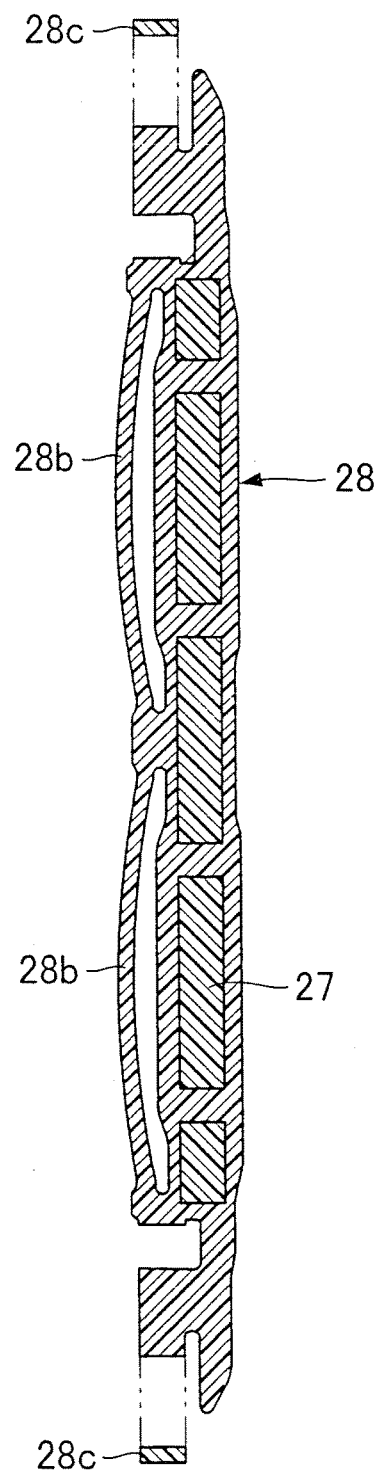
FIG. 9 illustrates the rear-side slide member in the window panel support structure according to the first embodiment of the present invention, and is a sectional view of a position corresponding to a line IX-IX in FIG. 8.

As illustrated in FIGS. 8 and 9, the rear slider 28 includes two spring portions 28b on a side opposite to the rail part 28a, that is, on an inner wall surface on the vehicle-body inner side. Further, the rear slider 28 includes spring portions 28c on a vehicle-body inner end face on a vehicle-body front side, that is, on respective sides thereof in the longitudinal direction. Note that the rear slider 28 may be considered as a second fitting part according to the present invention.

Two spring portions 28b are formed along the longitudinal direction of the rear slider 28. The spring portion 28b is formed in an arch shape that is elastically deformable. Hereby, the spring portions 28b are configured to exert force on an inner wall surface of a rear-side guide groove 60 due to its elasticity.

Accordingly, the rear slider 28 is configured such that the rail part 28a and the spring portions 28b are configured to exert force on the rear-side guide groove 60 in a sectional thickness direction of the rear slider 28. Note that the spring portion 28b may be considered as a second spring portion according to the present invention.

The spring portions 28c are formed integrally with the respective end parts of the rear slider 28 in the longitudinal direction so as to have a generally loop shape having an arch-shaped part that elastically deforms. The spring portions 28c are formed to be thick and elastically deformable. Hereby, the spring portions 28c are configured to exert force on an engaging part 51d due to their elasticity.

Accordingly, the rear slider 28 is configured such that, in a plane direction of the movable panel 21, a tip of the rear slider 28 is configured to exert force on the rear-side guide groove 60 and the spring portions 28c are configured to exert force on the engaging part 51d. Note that the spring portion 28c may be considered as a third spring portion according to the present invention.

The panel hold bracket 30 is connected to the regulator (not shown). As illustrated in FIG. 4, the panel hold bracket 30 is placed so as to overlap with the lower edge part 21d of the movable panel 21, and has two through holes 30a via which the panel hold bracket 30 is connected to the movable panel 21. The two through holes 30a correspond to two through holes 21e formed in the lower edge part 21d of the movable panel 21. Note that FIG. 4 only illustrates one of the through holes 30a.

In a case where the movable panel 21 is a sheet of reinforced glass, the two through holes 30a formed in the panel hold bracket 30 are aligned with the two through holes 21e formed in the lower edge part 21d of the movable panel 21, and bolts 31 are inserted into the through holes 30a so as to connect the panel hold bracket 30 to the movable panel 21.

More specifically, the through holes 21e are formed to have a diameter larger than a shaft diameter of the bolts 31, and two bolt support members 32 are attached to the movable panel 21 so as to protect the through holes 21e and front and back sides of the movable panel 21.

In the bolt support member 32, a reinforcing member 33 split into two parts adhering to a hole wall of the through hole 21e and the front and back sides of the movable panel 21 is fixed with an adhesive.

Further, an internal thread cap 34 is mounted on an inner circumference of the through hole 21e from an exterior side, an external thread cap 35 is mounted on a further inner circumferential side thereof from an interior side of the movable panel 21, and the thread caps 34, 35 are screwed with each other. In this state, the bolt 31 is inserted into the through hole 30a of the panel hold bracket 30, and further screwed with an internal screw thread part of the external thread cap 35. Thus, the panel hold bracket 30 and the movable panel 21 are connected to each other.

A connection part between the panel hold bracket 30 and the movable panel 21 is further configured to prevent occurrence of backlash or falling, by an intermediate body 36 such as a cushion body or a spacer, an adhesive 37, a washer 38, and the like. Further, as the panel hold bracket 30, it is preferable to provide a bracket that is suitable for a specification of the regulator, such as a wiring type or a link type.

Further, in a case where the movable panel 21 is a sheet of laminated glass, that is, in a case where the movable panel 21 is a sheet of laminated glass in which a film of an interlayer 21g is provided, strength thereof decreases as compared with the case where the movable panel 21 is a sheet of reinforced glass. Accordingly, when the movable panel 21 and the regulator are connected directly with bolts, durability with respect to an external force such as a load or a wind pressure that occurs when the movable panel 21 moves up and down might be impaired. Further, a fastening force of the bolts may deform an intermediate film at a fastening part.

Figure 10:
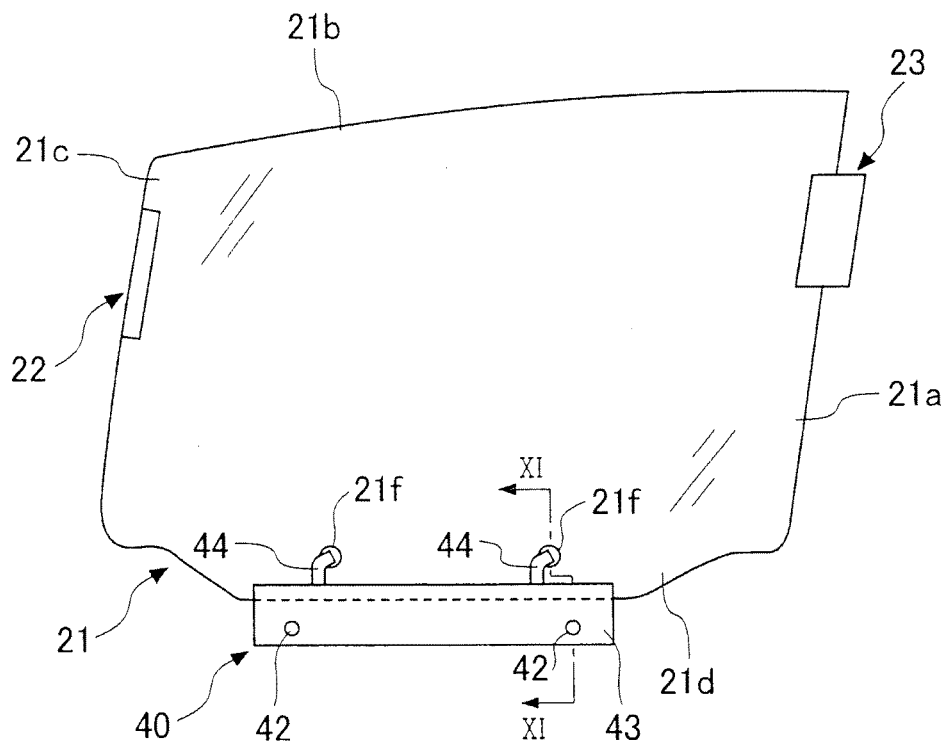
FIG. 10 illustrates a relationship with the movable panel in the window panel support structure according to the first embodiment of the present invention, and is a side view of a sheet of laminated glass as the movable panel.
Figure 11:
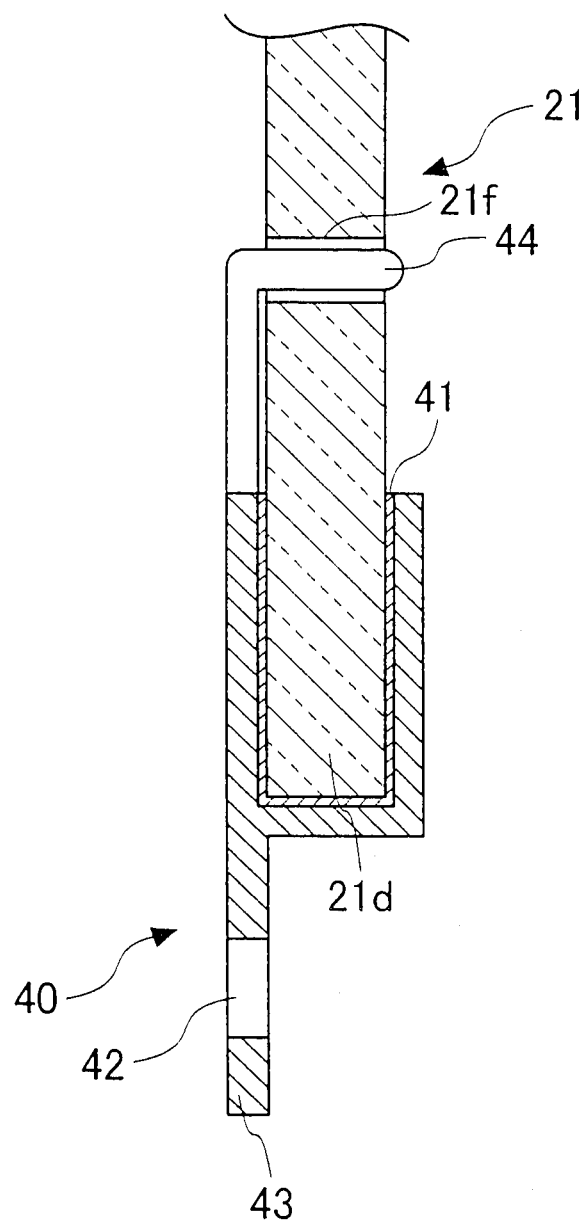
FIG. 11 illustrates a connection structure between the sheet of the laminated glass as the movable panel and the bracket in the window panel support structure according to the first embodiment of the present invention, and is an expanded sectional view of a position corresponding to a line XI-XI in FIG. 10.

In view of this, in this case, a panel hold bracket 40 that does not need bolding with respect to the movable panel 21 is used, as illustrated in FIG. 10. In the movable panel 21, two locking holes 21f are formed in vicinity to the lower edge part 21d. Further, as illustrated in FIG. 11, the movable panel 21 is fixed to the panel hold bracket 40 with an adhesive 41 over front and back sides and a bottom end face of the lower edge part 21d.

The panel hold bracket 40 integrally includes a fixed flange part 43 having through holes 42 through which bolts for fixing the panel hold bracket 40 to the regulator (not shown) penetrate. The panel hold bracket 40 integrally includes insertion pins 44 that are inserted into the locking holes 21f in a non-contact manner.

Hereby, even if the adhesive of the panel hold bracket 40 is peeled off from the movable panel 21, since the insertion pins 44 locks the movable panel 21, the movable panel 21 is not separated from the panel hold bracket 40.

Next will be described a state where the movable panel 21 is supported by the front-side guide member 12 and the rear-side guide member 51.

Figure 12A:
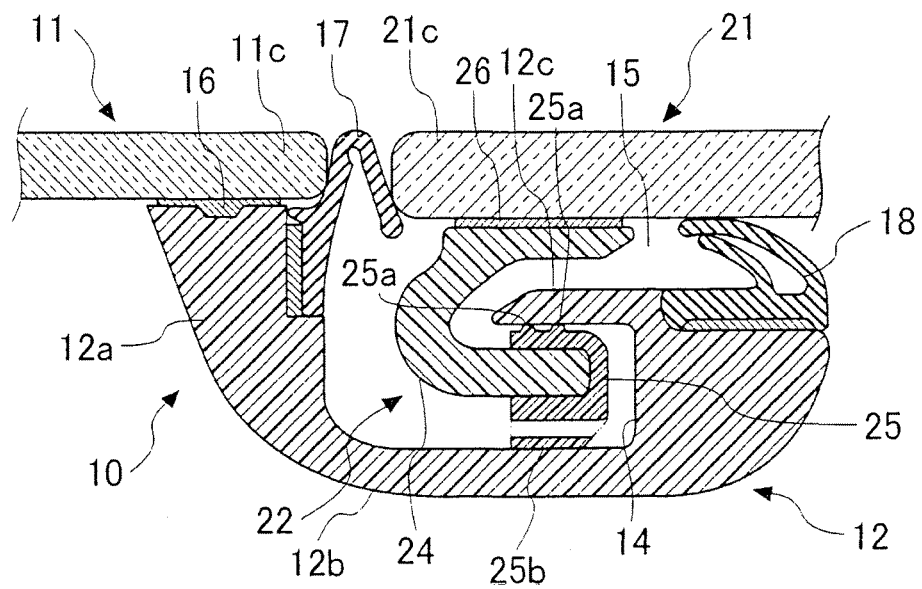
FIG. 12A and FIG. 12B illustrate a window panel front-side support structure according to the first embodiment of the present invention.
Figure 12B:
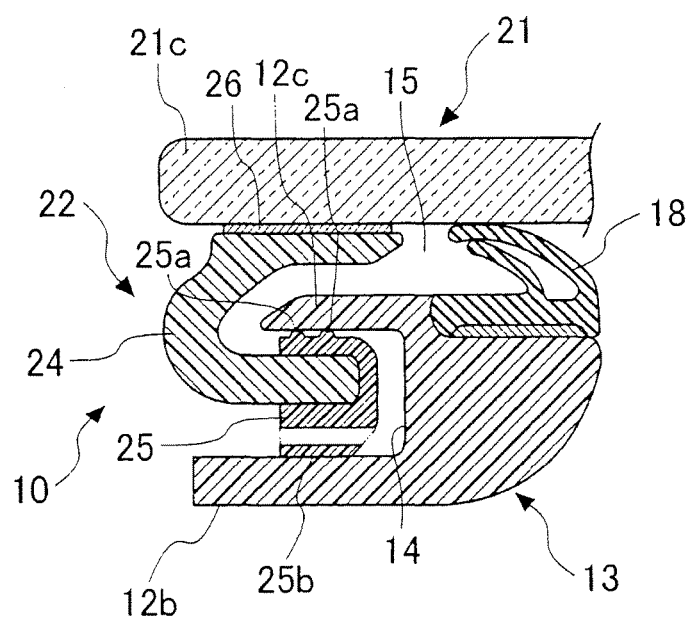

For example, when the upper edge part 21b of the movable panel 21 is placed above the upper edge part 3a of the door main body 3, the front edge part 21c of the movable panel 21 is supported by the front-side guide member 12 as illustrated in FIG. 12A. Further, when the upper edge part 21b of the movable panel 21 is placed below the upper edge part 3a of the door main body 3, for example, the front edge part 21c of the movable panel 21 is supported by the extending part 13 of the front-side guide member 12 as illustrated in FIG. 12B.

Note that, at the time of mounting a door to the vehicle body, a weather strip 17 provided in the base part 12a of the front-side guide member 12 is placed between the rear edge part 11c of the fixed panel 11 and the front edge part 21c of the movable panel 21, so that a gap therebetween is filled. Further, a weather strip 18 making contact with the interior-side face of the movable panel 21 is placed in the cover part 12b. This intends to restrain immersion of drops of water into the vehicle and wind sound at the time of running in the rain.

Note that the weather strip 17 may be provided between the rear edge part 11c of the fixed panel 11 and the front edge part 21c of the movable panel 21, and a shape of the weather strip 17 may be determined by a distance therebetween. At this time, the weather strip 17 does not attract attention so much as compared with a guide member including a center sash or the like in the related art in terms of the appearance.

The movable panel 21 is fitted into the front-side guide groove 14 of the front-side guide member 12 at a position where the front slider 25 of the front-side slide member 22 is placed so as to correspond to the notch 13a provided in the extending part 13 of the front-side guide member 12, so that the movable panel 21 is supported by the front-side guide member 12 so as to be movable up and down.

According to the configuration of the movable panel 21, it is possible to fit the front slider 25 into the front-side guide groove 14 so as to correspond to the notch 13a, and at the same time, it is possible to attach the fixed panel 11.

The front-side guide member 12 integrally includes the cover part 12b that projects so as to overlap with the interior-side face of the movable panel 21 in the space portion 15. Further, the front-side guide groove 14 is opened so as to communicate with the space portion 15. Hereby, it is possible to place the front-side slide member 22 in the space portion 15. That is, it is possible to place the front-side slide member 22 over the guide groove 14 and the space portion 15, so that a thickness of the front-side slide member 22 is absorbed by the guide groove 14 and the space portion 15.

Accordingly, when the window opening 4 is closed by the movable panel 21, the rear edge part 11c of the fixed panel 11 is placed so as to face the front edge part 21c of the movable panel 21, and at least surfaces of the panels 11, 21 are adjacent to each other on a plane or a curved surface without any steps. That is, an end face of the fixed panel 11 and an end face of the movable panel 21 are placed so as to face each other in an adjacent manner.

The rear edge part 21a of the movable panel 21 is supported by the rear-side guide member 51 attached to the sash 5 as illustrated in FIG. 13.

Here, a configuration of the sash 5 in the present embodiment is described below. In FIG. 13, a part of a vehicle body 6 includes a door opening part 6a. The sash 5 has a garnish 52 and an inner panel 53. The rear-side guide member 51 is fixed, with a bolt 55A and a nut 55B, to a reinforcement 54 fixed to the inner panel 53 by welding. Further, the garnish 52 is supported by the rear-side guide member 51 with an adhesive 56.

Note that, in FIG. 13, a weather strip 57 is provided in the garnish 52 so as to fill a gap between the garnish 52 and the rear edge part 21 a of the movable panel 21. A weather strip 58 is placed between the sash 5 or the door main body 3 and the vehicle body 6. A weather strip 59 is held by the rear-side guide member 51 so as to make contact with the interior-side face of the movable panel 21. Note that the rear-side guide member 51 may be fixed to the reinforcement 54 that is fixed to the inner panel 53 by welding, with a clip instead of the bolt 55A and the nut 55B.

The rear-side guide member 51 integrally includes a base part 51a, a thick part 51b and a folded-back rib 51c. The rear-side guide member 51 is fixed to the reinforcement 54 with the bolt 55A and the nut 55B via the base part 51a. The thick part 51b rises from a rear end of the base part 51a toward a vehicle-body outer side. The folded-back rib 51c projects from a tip of the thick part 51b toward a vehicle-body front side. Further, the base part 51a, the thick part 51b, and the folded-back rib 51c forms the rear-side guide groove 60 that is opened from the rear edge part 21a of the movable panel 21 toward the front edge part 21c.

On an inner wall surface of the base part 51a forming the rear-side guide groove 60, the engaging part 51d is formed integrally. The engaging part 51d has a wedge-shaped section that rises inwardly, i.e., toward the vehicle-body outer side. The engaging part 51d is formed at a position closer to the bolt 55A so as to be away from the rear-side guide groove 60. The engaging part 51d is configured so that the rear slider 28 does not fall out from the rear-side guide groove 60 due to vibration or the like of the vehicle body.

That is, the spring portions 28c of the rear slider 28 are configured to exert force on the engaging part 51d due to their elasticity, so as to absorb the backlash between the rear slider 28 and the rear-side guide groove 60 which occurs when the movable panel 21 moves up and down, thereby restraining occurrence of noise and falling.

Note that the spring portions 28b of the rear slider 28 are configured to exert force on the inner wall surface of the rear-side guide groove 60 due to their elasticity, so as to absorb the backlash between the rear slider 28 and the rear-side guide groove 60 which occurs when the movable panel 21 moves up and down, thereby restraining occurrence of noise.

Further, on an inner surface of the thick part 51b, for example, in the inner wall surface of the rear-side guide groove 60, a recessed part 51e for dust removal is formed along a moving up and down direction of the movable panel 21, that is, a vehicle-body up-and-down direction.

Hereby, even if the rear slider 28 tightly makes contact with the rear-side guide groove 60, it is possible to remove dust and dirt that penetrate the rear-side guide groove 60, from the recessed part 51e, thereby reducing such a possibility that the rear slider 28 is prevented from sliding. Note that the rear-side guide member 51 may be considered as a second guide member according to the present invention. Further, the rear-side guide groove 60 may be considered as a second guide groove according to the present invention.

The following describes an operation procedure of a case where the window panel 2 is assembled to the door main body 3 in the above configuration.

Figure 14:
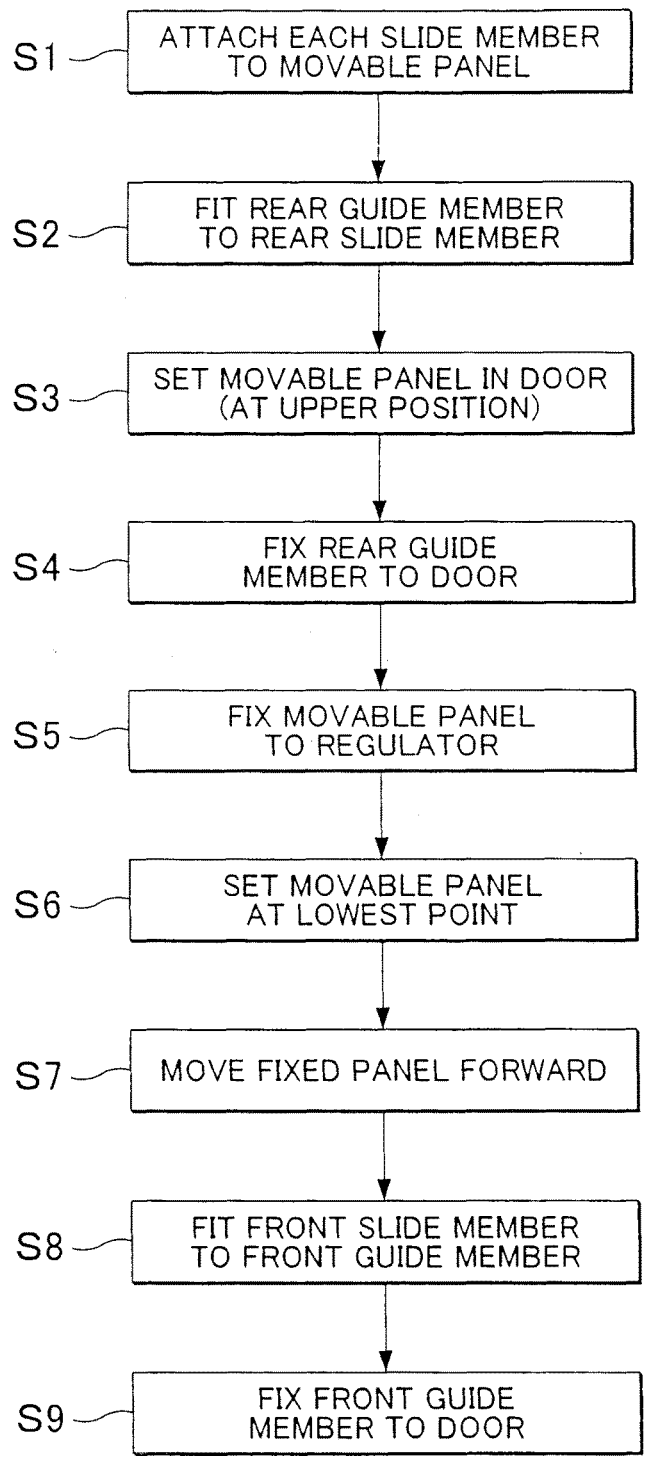
FIG. 14 is a flow diagram of an operation routine of a panel setting procedure in the window panel support structure according to the first embodiment of the present invention.

As illustrated in FIG. 14, an operator assembles the movable panel 21 in advance by attaching the front-side slide member 22, the rear-side slide member 23, and the bolt support member 32 to the movable panel 21 (step S1). Further, the operator assembles the fixed panel 11 by attaching the front-side guide member 12 to the fixed panel 11. Note that the assembling of the fixed panel 11 is not necessarily performed at this timing.

Then, the operator inserts the rear-side guide member 51 from a lower side of the movable panel 21 so that the rear-side guide groove 60 of the rear-side guide member 51 is fitted into the rear slider 28 of the rear-side slide member 23 (step S2).

In this state, the operator moves the movable panel 21 above the door main body 3, and places the rear-side guide member 51 at a fixed position (step S3).

Further, the operator fixes the rear-side guide member 51 with the bolt 55A and the nut 55B (step S4).

Then, the operator fixes the panel hold bracket 30 to the bolt support member 32, connects the regulator to the panel hold bracket 30, and fixes the movable panel 21 to the regulator (step S5). Note that the regulator and the panel hold bracket 30 are fastened with another bolt.

Then, the operator moves the movable panel 21 downward to a lowest point by driving the regulator or by manual operation (step S6).

Figure 15A:
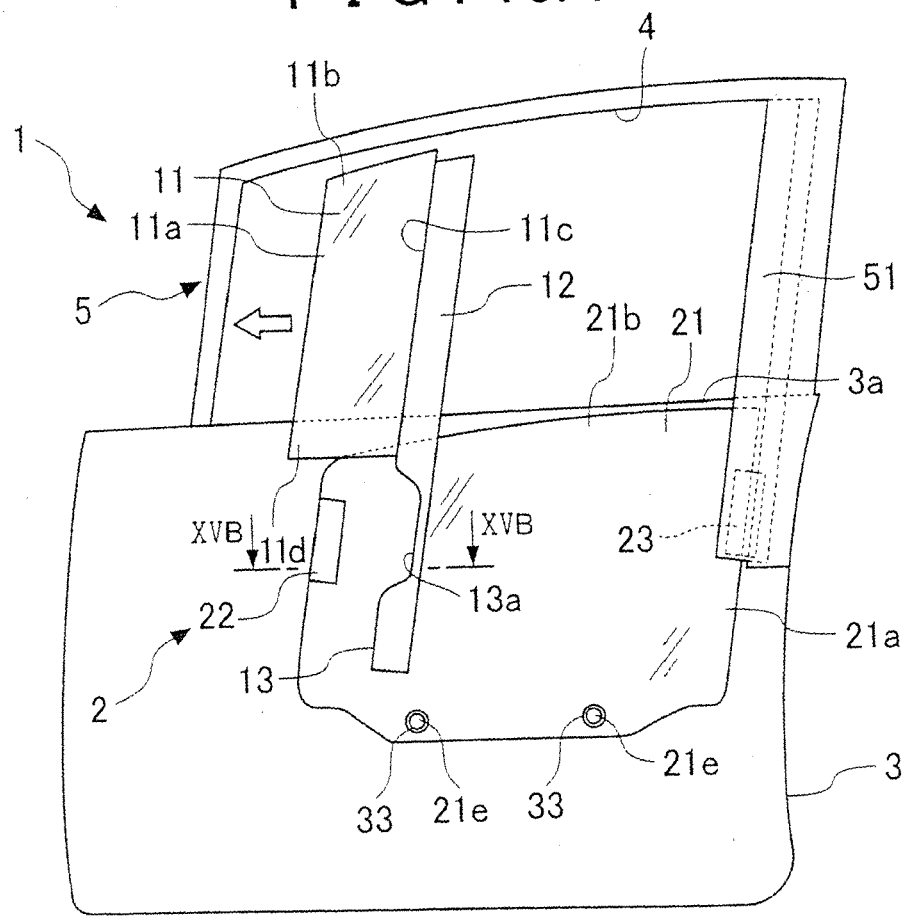
FIG. 15A and FIG. 15B illustrate the window panel support structure according to the first embodiment of the present invention.
Figure 15B:
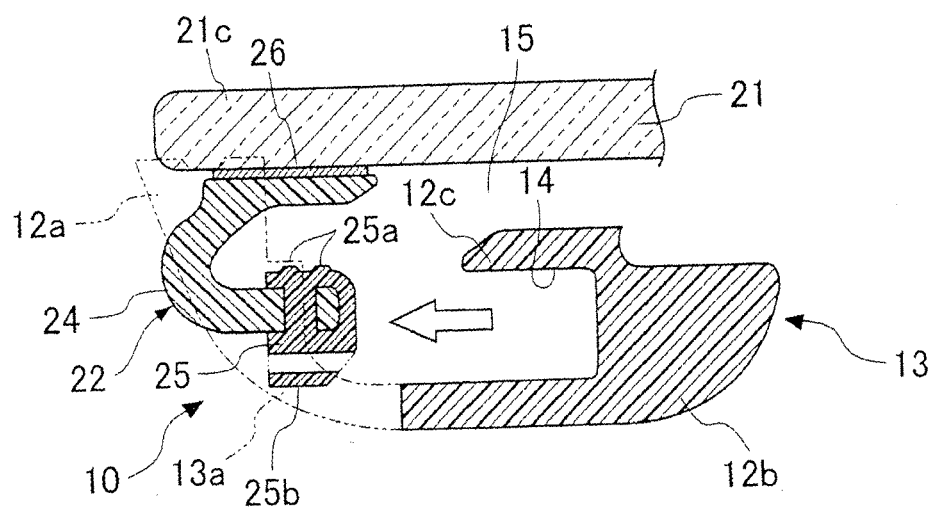
Figure 16:
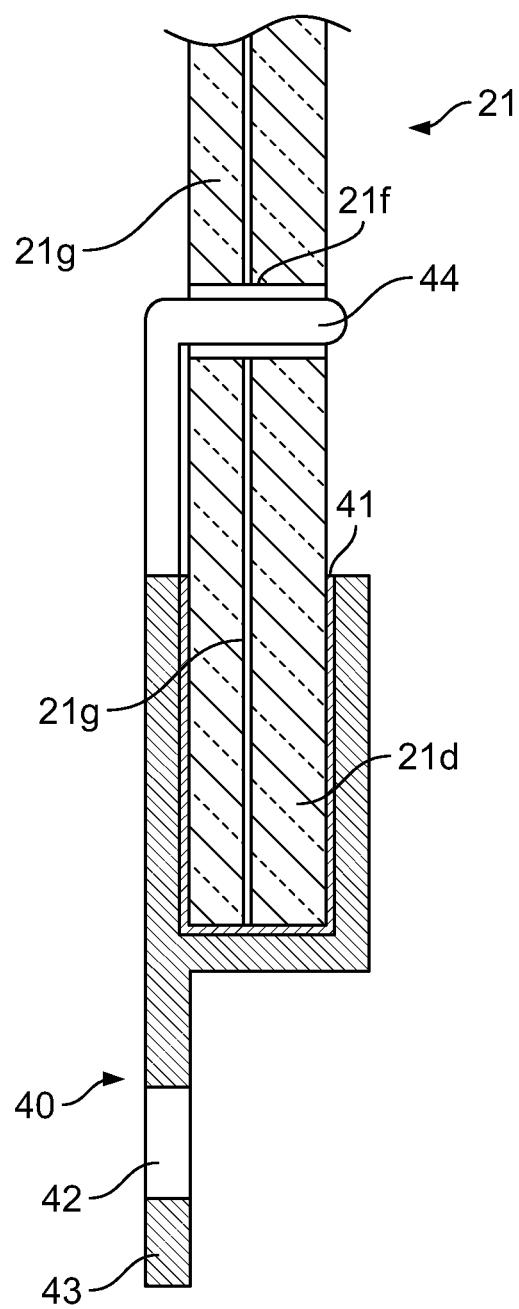
FIG. 16 illustrates the window panel support structure according to another embodiment of the present invention, where the movable panel is a sheet of laminated glass including an interlayer.

In this state, the operator moves the fixed panel 11 from the window opening 4 to the vehicle-body front side as illustrated in FIG. 15 (step S7).

Here, in a state where the movable panel 21 is placed at the lowest point, the operator moves the fixed panel 11 to the vehicle-body front side of the window opening 4 while checking whether the notch 13a formed in the extending part 13 of the front-side guide member 12 is aligned with the front-side slide member 22 in a height direction. Hereby, the front-side slide member 22 is guided from the notch 13a that communicates with the space portion 15 so that the front-side slide member 22 is placed over the space portion 15 and the front-side guide groove 14, thereby fitting the front-side slide member 22 into the front-side guide groove 14 of the extending part 13 (step S8). That is, the notch 13a is configured such that, when the front-side slide member 22 is fitted to the front-side guide member 12, the notch 13a guides the front-side slide member 22 from an outside of the front-side guide member 12 so that that the front-side slide member 22 is placed over the space portion 15 and the front-side guide groove 14.

Note that the notch 13a is expanded toward the front edge part 11a of the fixed panel 11, so that even if the notch 13a is not completely aligned with the front-side slide member 22 in the height direction, it is possible to easily fit the front-side slide member 22 into the front-side guide groove 14.

Further, that corner of a tip of the front slider 25 which is on a side where the rail part 25a is formed has an R shape and that corner of the tip of the front slider 25 which is on a side where the spring portions 25b are formed serves as a tapered part 25e, thereby facilitating the fitting into the front-side guide groove 14.

In this state, the operator fixes the front-side guide member 12 to the door main body 3 and the sash 5 with bolts appropriately (step S9).

Note that each operation by the operator is described on the presumption that the movable panel 21 is a sheet of reinforced glass. However, in a case where the movable panel 21 is a sheet of laminated glass, the movable panel 21 is fixed to the panel hold bracket 40 in the procedure of assembling the bolt support member 32, and the fixed flange part 43 of the panel hold bracket 40 is fixed to the regulator with bolts.

The invention claimed is:
1. A window panel support structure comprising:
a window frame;
a fixed panel fixed to the window frame;
a movable panel placed in the window frame so as to be planarly adjacent to the fixed panel, and configured to move up and down in the window frame along a sliding direction;
a guide member provided on an interior-side face of a first edge part of the fixed panel and including a guide groove provided along the first edge part of the fixed panel, the first edge part of the fixed panel being adjacent to the movable panel, and the guide groove being opened toward a second edge part of the fixed panel; and
a slide member provided on an interior-side face of a first edge part of the movable panel and including a fitting part provided along the first edge part of the movable panel, and the fitting part including an opening, the first edge part of the movable panel being adjacent to the fixed panel, and the slide member being bent toward a second edge part of the movable panel and positioned within the guide groove, wherein:
the fitting part positioned within the guide groove and an end portion of the slide member is positioned within, and covered by, the opening of the fitting part so that the movable panel is supported by the guide member so as to be movable up and down;
the first edge part of the fixed panel and the second edge part of the fixed panel are opposite ends of the fixed panel in a front-rear direction of the window panel support structure; and
the first edge part of the movable panel and the second edge part of the movable panel are opposite ends of the movable panel in the front-rear direction of the window panel support structure, wherein:

the guide member includes a base part that is provided on the interior-side face of the fixed panel and projects in a direction away from the interior-side face of the fixed panel and a cover part that projects from the base part toward the movable panel so as to form a space portion between the cover part and an interior-side face of the movable panel, a folded back rib of the cover part overlaps with the interior-side face of the movable panel in the space portion and overlaps the end portion of the slide member positioned in, and covered by, the fitting part, the folded-back rib projects inwardly from a projecting end of the cover part of the guide member toward the second edge part of the fixed panel, and at least a portion of one side of the fitting part contacts a surface of the folded back rib, and at least a portion of another side of the fitting part contacts a surface of the cover part of the guide member;

the slide member is bent so as to be placed over the space portion and the guide groove; when a window opening is closed by the movable panel, an end face of the fixed panel and an end face of the movable panel face each other; and the space portion is a space formed between the guide member and the interior-side face of the movable panel and wherein:

the guide member includes a notch on a side close to the second edge part of the fixed panel; and the notch extends along the first edge part of the fixed panel.

2. The window panel support structure according to claim 1, wherein:

the guide member includes an extending part which extends below a lower edge part of the fixed panel; and the notch is provided in the extending part.

3. The window panel support structure according to claim 1, wherein the fitting part includes a spring portion configured to exert force on an inner wall surface of the guide groove.

4. The window panel support structure according to claim 3, further comprising:

a second slide member provided on the interior-side face of the second edge part of the movable panel, along the second edge part of the movable panel; and a second guide member provided in the window frame and that engages with the second slide member, wherein:

the second slide member is engaged with the second guide member so that the movable panel is supported by the second guide member so as to be movable up and down;

the second slide member includes a second fitting part;

the second fitting part projects from the second edge part of the movable panel and faces the window frame;

the second guide member includes a second guide groove that is opened toward the second edge part of the movable panel;

the second fitting part is positioned within the second guide groove; and an opening part of the second guide groove is provided with an engaging part configured to engage with the second fitting part.

5. The window panel support structure according to claim 4, wherein:

the second fitting part integrally includes a second spring portion and a third spring portion;

the second spring portion is configured to exert force on an inner wall surface of the second guide groove; and the third spring portion is configured to exert force on the engaging part.

6. The window panel support structure according to claim 4, wherein a recessed part extending along the sliding direction of the movable panel is formed on an inner wall surface of the second guide groove.

7. The window panel support structure according to claim 1, wherein:

the movable panel is a sheet of reinforced glass; and a lower edge part of the sheet of the reinforced glass is held by a bracket with a bolt.

8. The window panel support structure according to claim 7, further comprising a regulator that is configured to move the movable panel up and down, wherein the bracket is connected to the regulator.

9. The window panel support structure according to claim 1, wherein:

the movable panel is a sheet of laminated glass including an interlayer;

a lower edge part of the sheet of the laminated glass is held by a bracket with an adhesive;

an insertion pin is provided in the bracket;

a locking hole is formed in the lower edge part of the movable panel; and the insertion pin is inserted into the bracket without contacting the bracket.

10. The window panel support structure according to claim 9, further comprising a regulator that is configured to move the movable panel up and down, wherein the bracket is connected to the regulator.

11. The window panel support structure according to claim 1, wherein:

the guide member further includes a folded-back rib;

the base part is provided on the interior-side face of the first edge part of the fixed panel, projects toward a vehicle-body inner side in a vehicle-width direction, and has a recessed part that is recessed toward the movable panel;

the folded-back rib projects toward the fixed panel from a projecting end of the cover part; and the notch is constituted by the recessed part of the base part.

12. The window panel support structure according to claim 11, wherein the base part, the cover part, and the folded-back rib are integrally formed.

13. The window panel support structure according to claim 1, wherein the notch is configured such that, when the slide member is engaged with the guide member, the notch guides the slide member from an outside of the guide member so that that the slide member is placed over the space portion and the guide groove.

14. The window panel support structure according to claim 1, wherein the notch is expanded toward the second edge part of the fixed panel.

* * * * *